US012646429B2

(12) United States Patent
Thorn

(10) Patent No.: US 12,646,429 B2
(45) Date of Patent: Jun. 2, 2026

(54) HITCH MOUNTABLE PARKING ARM DEVICE AND METHOD OF USE

(71) Applicant: Brett Thorn, Chanhassen, MN (US)

(72) Inventor: Brett Thorn, Chanhassen, MN (US)

( * ) Notice: Subject to any disclaimer, the term of this patent is extended or adjusted under 35 U.S.C. 154(b) by 88 days.

(21) Appl. No.: 18/386,123

(22) Filed: Nov. 1, 2023

(65) Prior Publication Data

US 2025/0140136 A1    May 1, 2025

(51) Int. Cl.
*G09F 21/04*        (2006.01)
*B60D 1/58*        (2006.01)

(52) U.S. Cl.
CPC ............... *G09F 21/04* (2013.01); *B60D 1/58* (2013.01)

(58) Field of Classification Search
CPC .................................. G09F 21/04; B60D 1/58
See application file for complete search history.

(56) References Cited

U.S. PATENT DOCUMENTS

| | | | |
|---|---|---|---|
| 3,788,268 A | 1/1974 | Hiatt | |
| 4,825,192 A * | 4/1989 | Wells | B60R 19/38 |
| | | | 280/765.1 |
| 4,946,102 A * | 8/1990 | DeWitt | A01M 7/0075 |
| | | | 239/600 |
| 6,254,151 B1 | 7/2001 | Lamparter | |
| 6,652,182 B1 * | 11/2003 | Ellefson | E01F 13/046 |
| | | | 116/28 R |
| 8,740,267 B1 | 6/2014 | Wilson | |
| 10,513,219 B1 * | 12/2019 | Hassler | B60D 1/58 |

| | | | |
|---|---|---|---|
| 2003/0070603 A1 | 4/2003 | VanderMolen | |
| 2003/0164436 A1 * | 9/2003 | Rooker | G09F 21/04 |
| | | | 248/441.1 |
| 2003/0184048 A1 * | 10/2003 | Bonde | B60D 1/52 |
| | | | 280/491.5 |
| 2004/0245795 A1 * | 12/2004 | Hansen | B60P 3/40 |
| | | | 296/26.08 |
| 2006/0156600 A1 * | 7/2006 | Barker | G09F 17/00 |
| | | | 40/591 |
| 2006/0218835 A1 * | 10/2006 | Chafin | G09F 21/04 |
| | | | 40/611.05 |
| 2012/0050070 A1 | 3/2012 | Hider | |
| 2012/0111261 A1 * | 5/2012 | Schmitt | B60Q 1/2657 |
| | | | 116/28 R |
| 2012/0204454 A1 * | 8/2012 | Larsen | G09F 21/04 |
| | | | 40/606.03 |
| 2014/0338137 A1 * | 11/2014 | Stokes | B60P 1/43 |
| | | | 14/71.1 |
| 2017/0114966 A1 * | 4/2017 | McCurdy | B60Q 1/247 |
| 2018/0345872 A1 * | 12/2018 | Kraeuter | B60R 9/06 |
| 2021/0261060 A1 * | 8/2021 | Schwarz | B60D 1/52 |

* cited by examiner

*Primary Examiner* — Gary C Hoge

(57)        ABSTRACT

A hitch mountable parking arm device for maintaining access to vehicle includes a mount, upright support, and an arm. The mount is removably securable to a hitch receiver, which is attachable to a rear end of a first vehicle. The upright support has an upper and lower ends, with the lower end being attached to the mount so that the upright support extends vertically from the mount. The arm, which is attached to and which extends perpendicularly from the upper end, is horizontally orientated when the upright support is vertically orientated. The arm comprises a plurality of interconnected segments and is reversibly positionable in a stowed and deployed positions having retracted and extended lengths, respectively. The arm is extendable into an adjacent parking spot or an access aisle when the mount is engaged with the hitch receiver.

11 Claims, 13 Drawing Sheets

HITCH MOUNTABLE PARKING ARM DEVICE AND METHOD OF USE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to parking control devices and more particularly pertains to a new parking control device for maintaining access to vehicle, and in particular a vehicle being used to transport a user who is handicapped. Maintaining access to a door for egress and reentry is essential for such users and access can be impeded by parking of another vehicle alongside that of the user. In particular, when a vehicle includes a wheelchair ramp, there must be sufficient room not only for the ramp but also for the wheelchair to move onto or off of the ramp. Therefore, parking control devices which can deter or prevent such an occurrence are desirable.

(2) Description of Related Art Including Information Disclosed Under 37 CFR 1.97 and 1.98

The prior art relates to parking control devices and in particular parking control devices that are attachable to and deployable from vehicles but which are not removably securable to a hitch receiver that is attachable to a vehicle.

(h) BRIEF SUMMARY OF THE INVENTION

An embodiment of the disclosure meets the needs presented above by generally comprising a mount, upright support, and an arm. The mount is configured to be removably securable to a hitch receiver, which is attachable to a rear end of a first vehicle. The upright support has an upper end and a lower end, with the lower end being attached to the mount so that the upright support extends vertically from the mount. The arm, which is attached to and which extends perpendicularly from the upper end, is horizontally orientated when the upright support is vertically orientated. The arm comprises a plurality of interconnected segments and is reversibly positionable in a stowed position having a retracted length and in a deployed position having an extended length. The arm is extendable into an adjacent parking spot or an access aisle when the mount is engaged with the hitch receiver.

Another embodiment of the disclosure includes a hitch mounted parking arm system, which comprises a first vehicle and a hitch mountable parking arm device, as per the specification above. The first vehicle has a rear end to which a hitch receiver is attached. The hitch mountable parking arm device is removably secured to the hitch receiver using the mount. The arm of the hitch mountable parking arm device is reversibly positionable in a stowed position having a retracted length and in a deployed position having an extended length. The arm thus is extendable into an adjacent parking spot or an access aisle.

Yet another embodiment of the disclosure includes a method of preventing a second vehicle from parking alongside a first vehicle entails provision of the hitch mountable parking arm device, according to the disclosure above. Steps of the method include removably securing the mount to a hitch receiver that is attached to the first vehicle, parking the first vehicle in an accessible parking spot, and deploying the arm so that the arm extends linearly from the upright support into an adjacent parking spot or an access aisle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
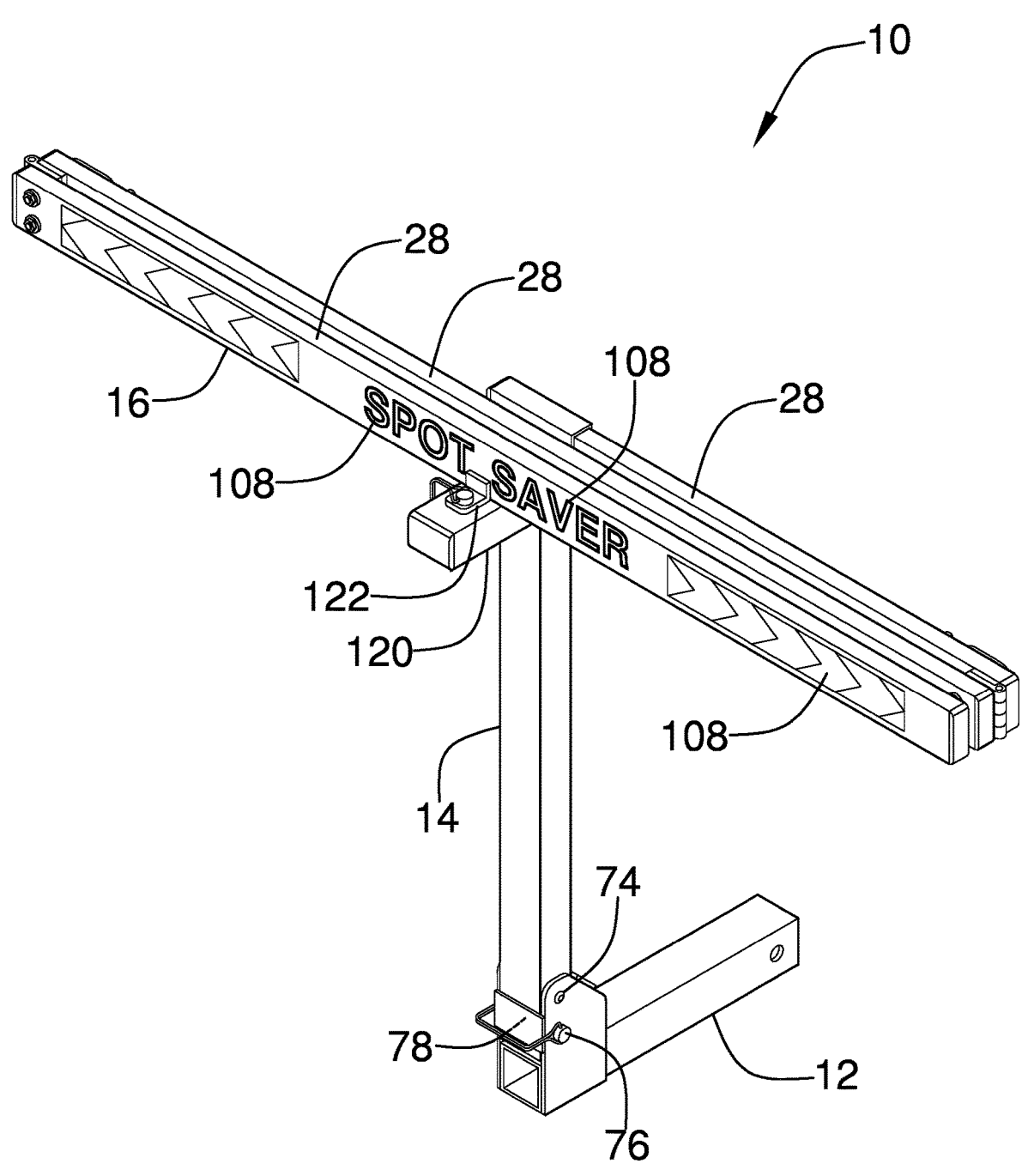
FIG. 1 is a rear isometric perspective view of a hitch mountable parking arm device according to an embodiment of the disclosure.

With reference now to the drawings, and in particular to FIGS. 1 through 13 thereof, a new parking control device embodying the principles and concepts of an embodiment of the disclosure and generally designated by the reference numeral 10 will be described.

Figure 6:
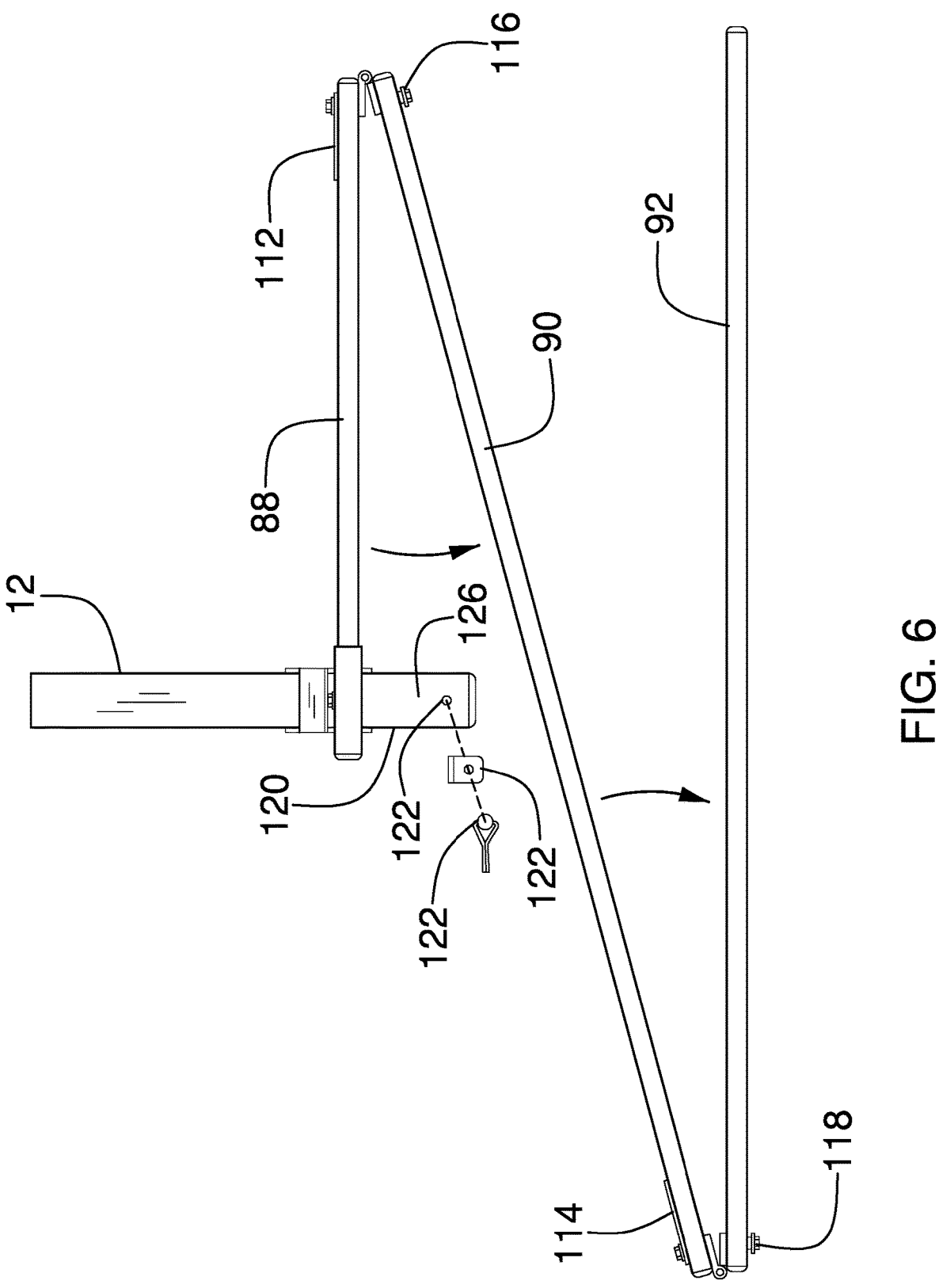
FIG. 6 is a top view of an embodiment of the disclosure in a partially deployed position.
Figure 7:
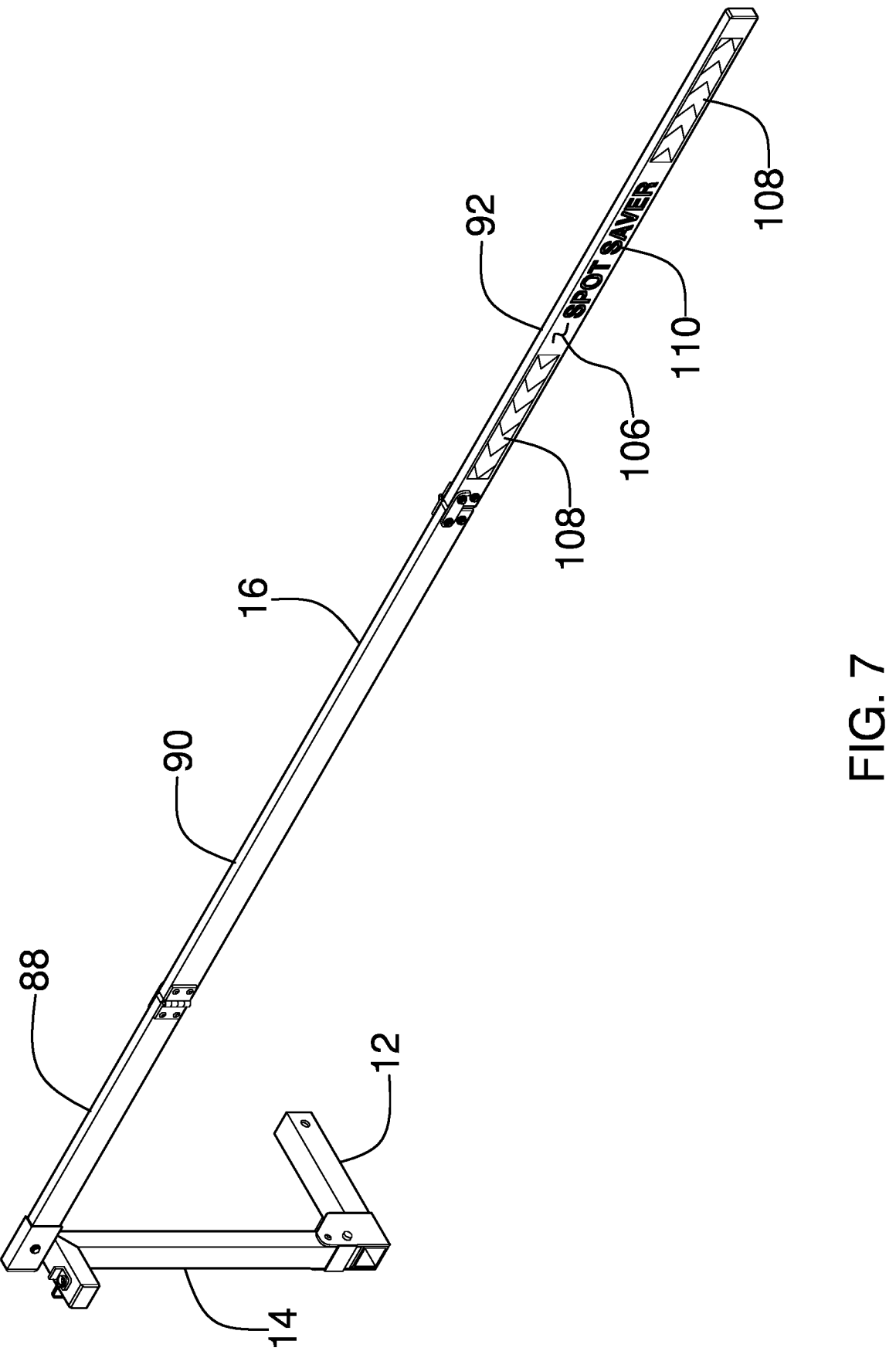
FIG. 7 is an isometric perspective view of an embodiment of the disclosure in a deployed position.
Figure 8:
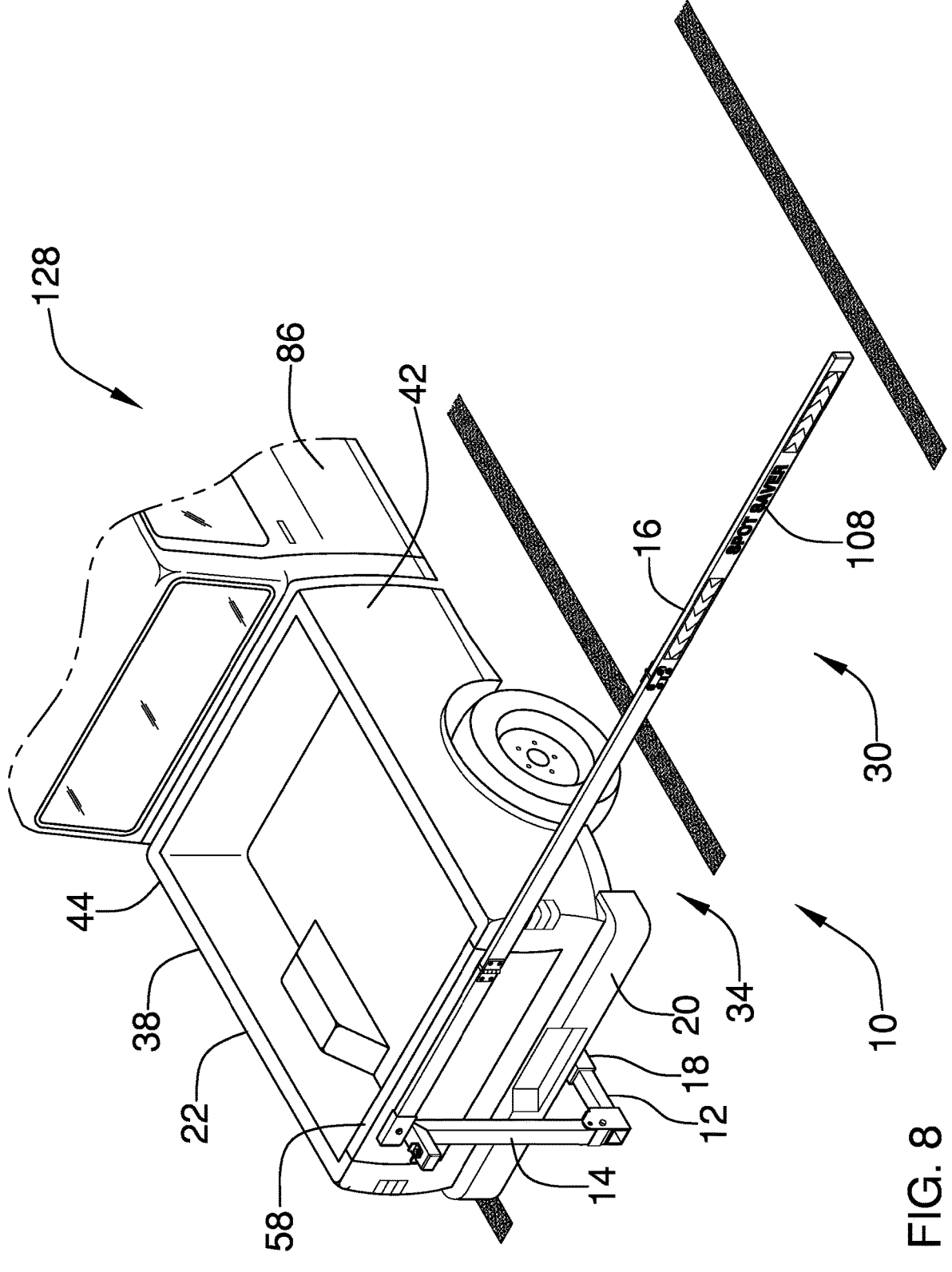
FIG. 8 is an in-use view of an embodiment of the disclosure.
Figure 12:
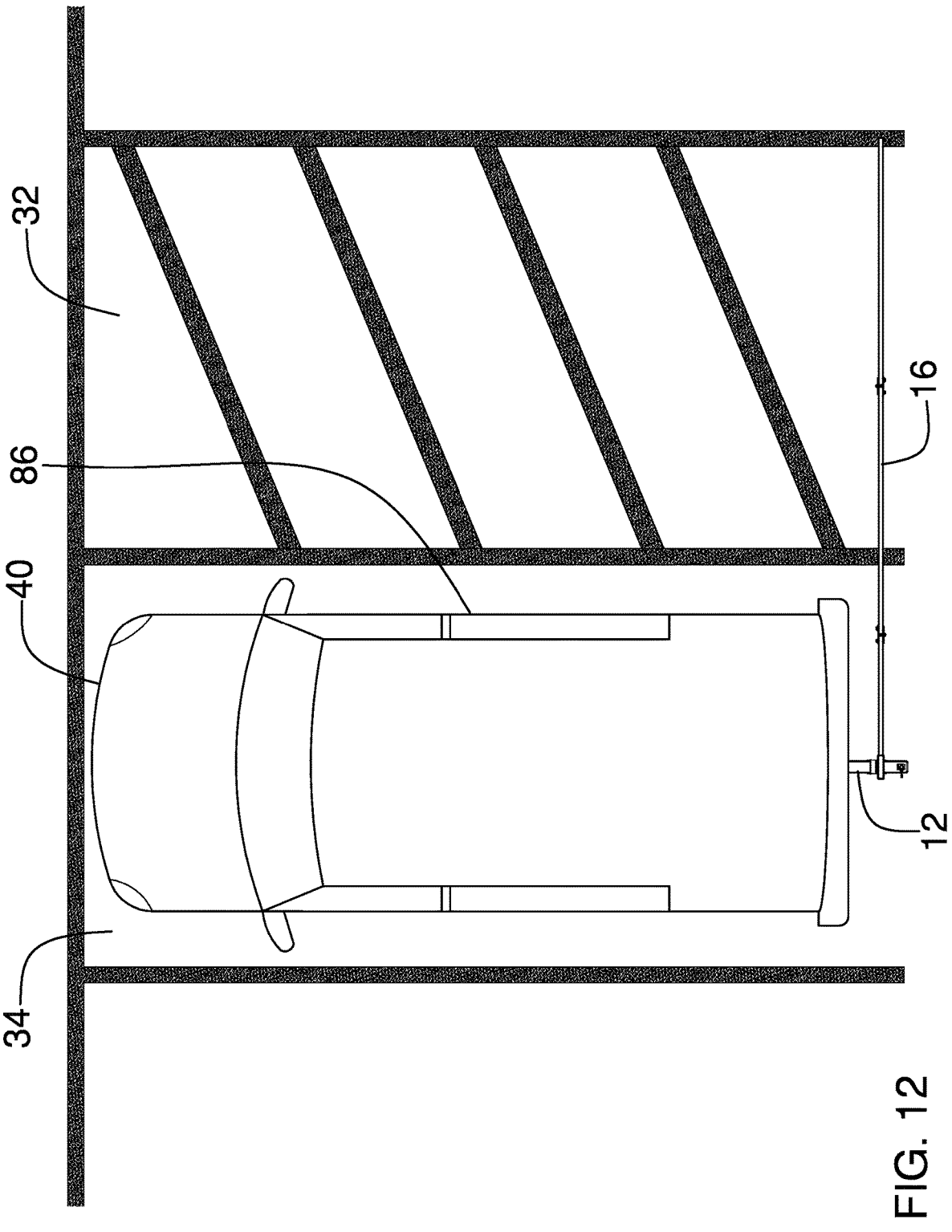
FIG. 12 is an in-use view of an embodiment of the disclosure.
Figure 13:
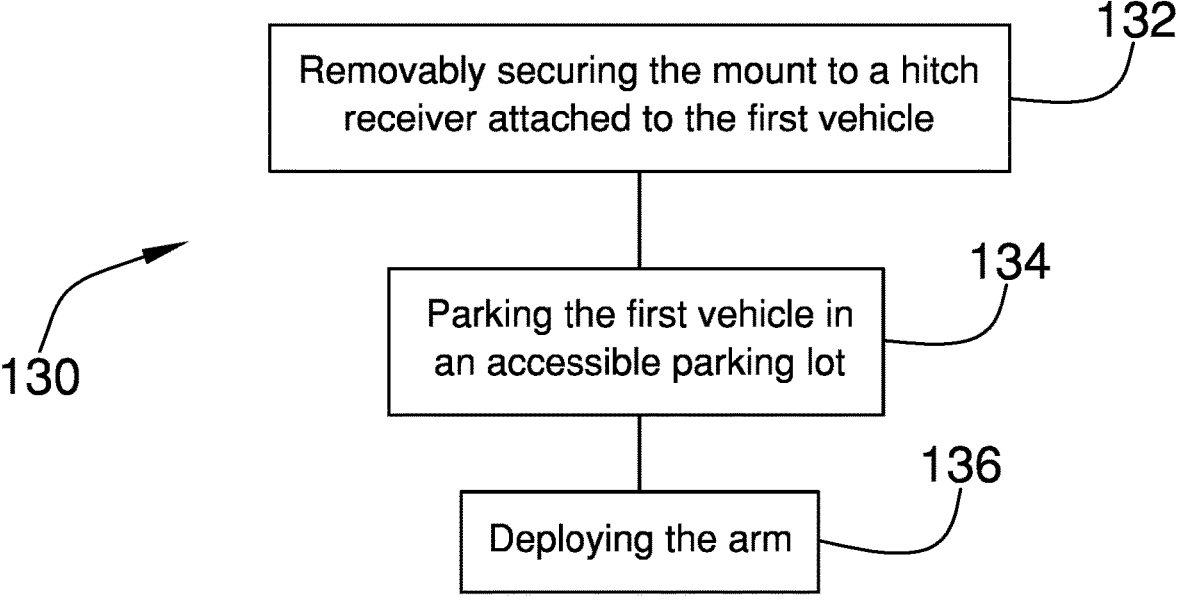
FIG. 13 is a flow diagram for a method utilizing an embodiment of the disclosure.

As best illustrated in FIGS. 1 through 13, the hitch mountable parking arm device 10 generally comprises a mount 12, an upright support 14, and an arm 16. The mount 12 is configured to be removably securable to a hitch receiver 18, which is attachable to a rear end 20 of a first vehicle 22. The upright support 14 has an upper end 24 and a lower end 26, with the lower end 26 being attached to the mount 12 so that the upright support 14 extends vertically from the mount 12. The arm 16, which is attached to and which extends perpendicularly from the upper end 24, is horizontally orientated when the upright support 14 is vertically orientated. The arm 16 comprises a plurality of interconnected segments 28 and is reversibly positionable in a stowed position having a retracted length, as is shown in FIGS. 1-5, and in a deployed position having an extended length, as is shown in FIG. 7. The arm 16 is extendable into an adjacent parking spot 30, as is shown in FIG. 8, or an access aisle 32, as is shown in FIG. 12, when the mount 12 is engaged with the hitch receiver 18.

Typically, the hitch mountable parking arm device 10 would be mounted to a first vehicle 22 used for transport of a handicapped person. Upon parking the first vehicle 22 in an accessible parking spot 34, the arm 16 can be deployed so that it extends from the first vehicle 22 into an adjacent access aisle 32, thereby preventing a second vehicle 36 from parking within the access aisle 32. The hitch mountable parking arm device 10 is anticipated to be of particular use with a handicap truck 38 or car, as is shown in FIGS. 8-11, and a handicap van 40, as is shown in FIG. 12, and would be configured so as to extend past the passenger's side 42 of the first vehicle 22. Although typically configured for extension of the arm 16 past a passenger's side 42 of the first vehicle 22, the hitch mountable parking arm 16 device also could be configured to extend past a driver's side 44 of the first vehicle 22 or to be switchable to extend past either the passenger's side 42 or the driver's side 44.

The mount 12 may comprise a hitch tube 46 having a first end 48, a second end 50, an upper face 52, a lower face 54, opposed side faces 56, a size, and shape, with the size and shape being complementary to hitch receiver 18 that is tubular. The hitch tube 46 is configured to be inserted by the first end 48 into the hitch receiver 18 to removably secure the hitch tube 46 to the first vehicle 22. The mount 12 also could be configured for attachment to a tow ball (not shown). The present invention anticipates the hitch tube 46 being sized either to fit any conventionally size hitch receivers 18, such as 1.25 inch and 2 inch hitch receivers 18, though any size may be utilized from Class I through Class V hitch sizes. The present invention also anticipates the hitch tube 46 is configured to be selectively sizable to fit either a two inch hitch receiver 18 or a four inch hitch receiver 18.

The hitch tube 46 has a pair of first holes 64 positioned therein such that the first holes 64 are opposingly positioned in the opposed side faces 56 proximate to the first end 48. A hitch pin 66 is selectively insertable through a pair of second holes 68 in the hitch receiver 18 and the pair of first holes 64 to removably secure the hitch tube 46 to the hitch receiver 18.

Figure 9:
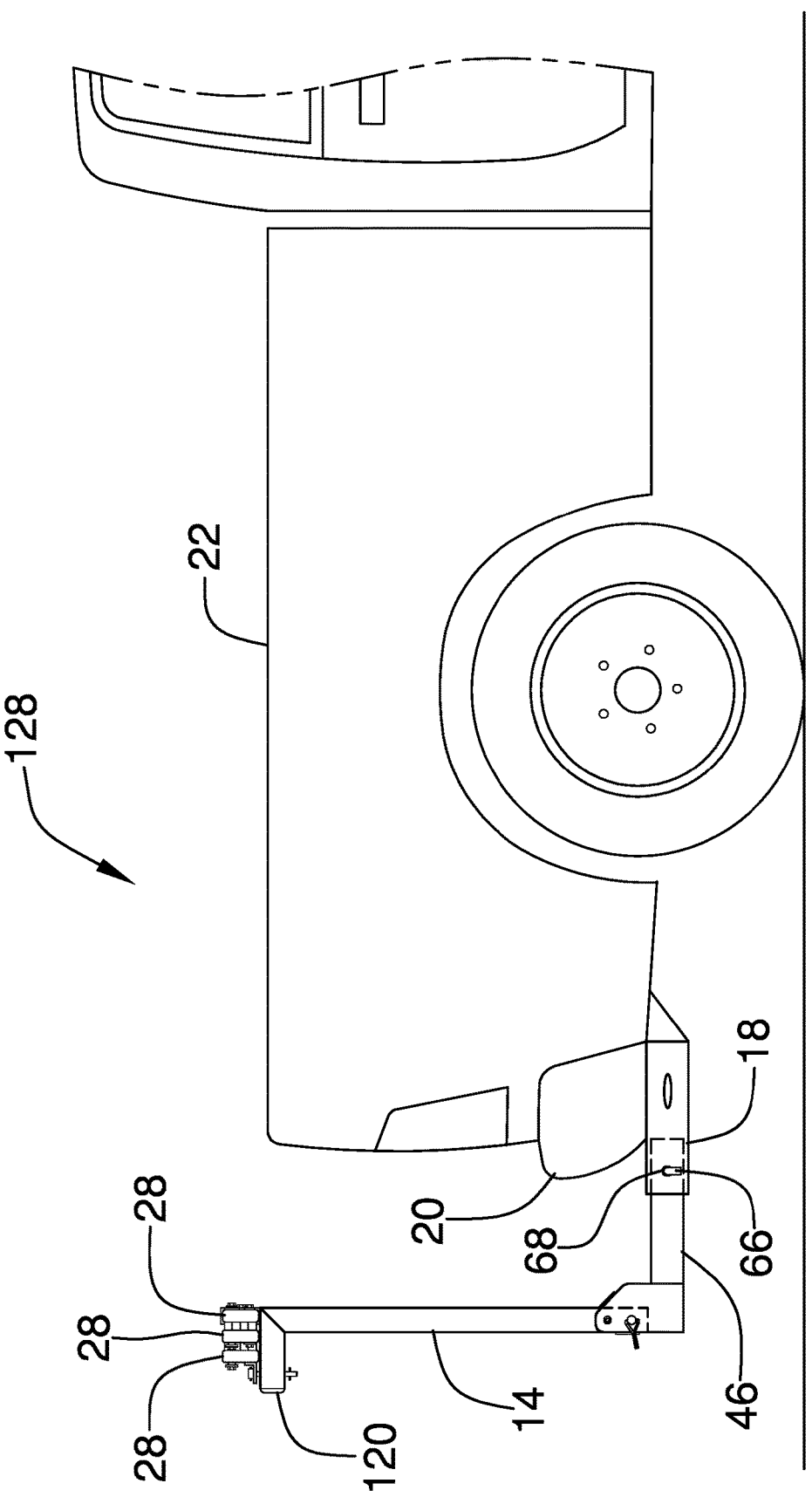
FIG. 9 is an in-use view of an embodiment of the disclosure.
Figure 10:
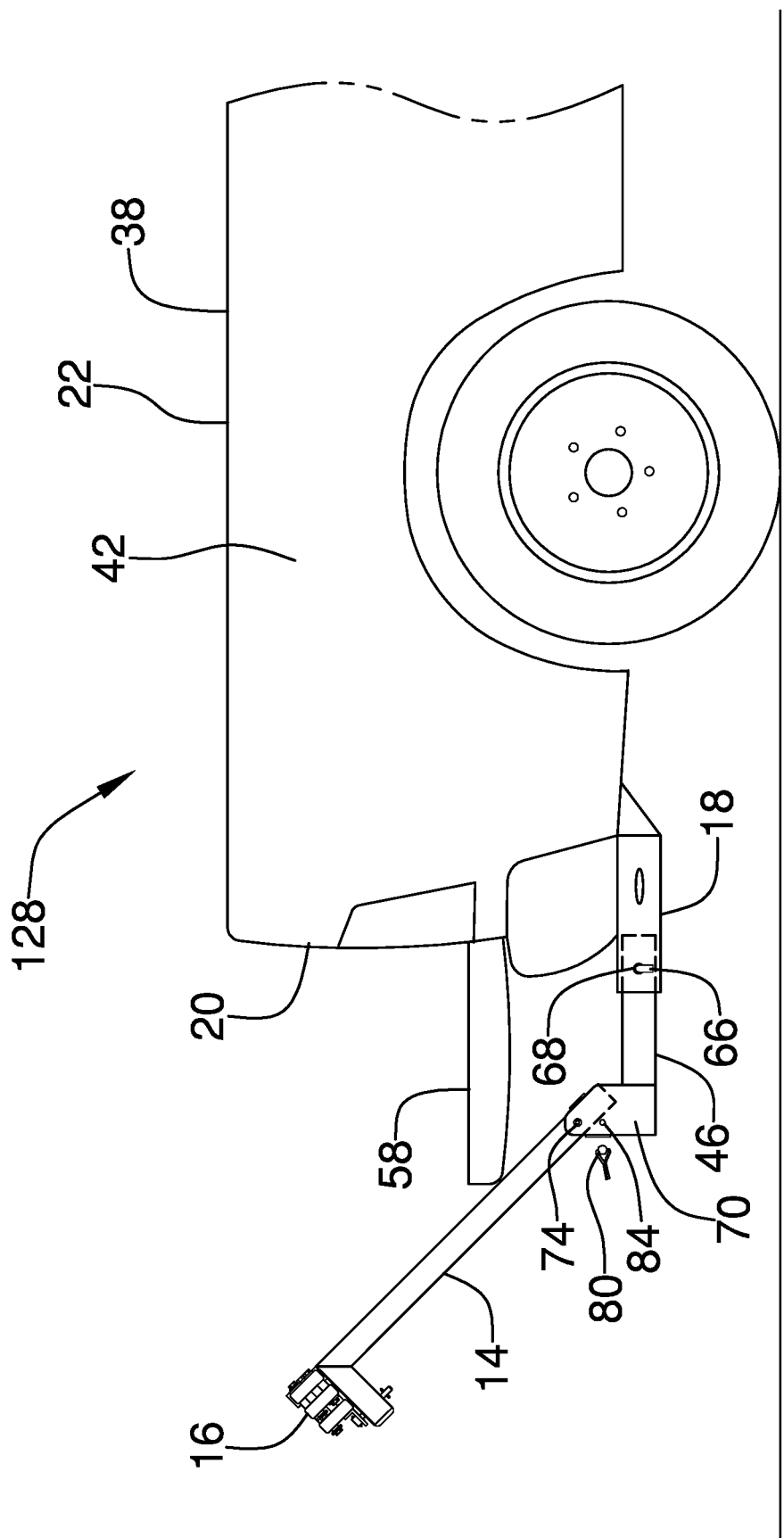
FIG. 10 is an in-use view of an embodiment of the disclosure.
Figure 11:
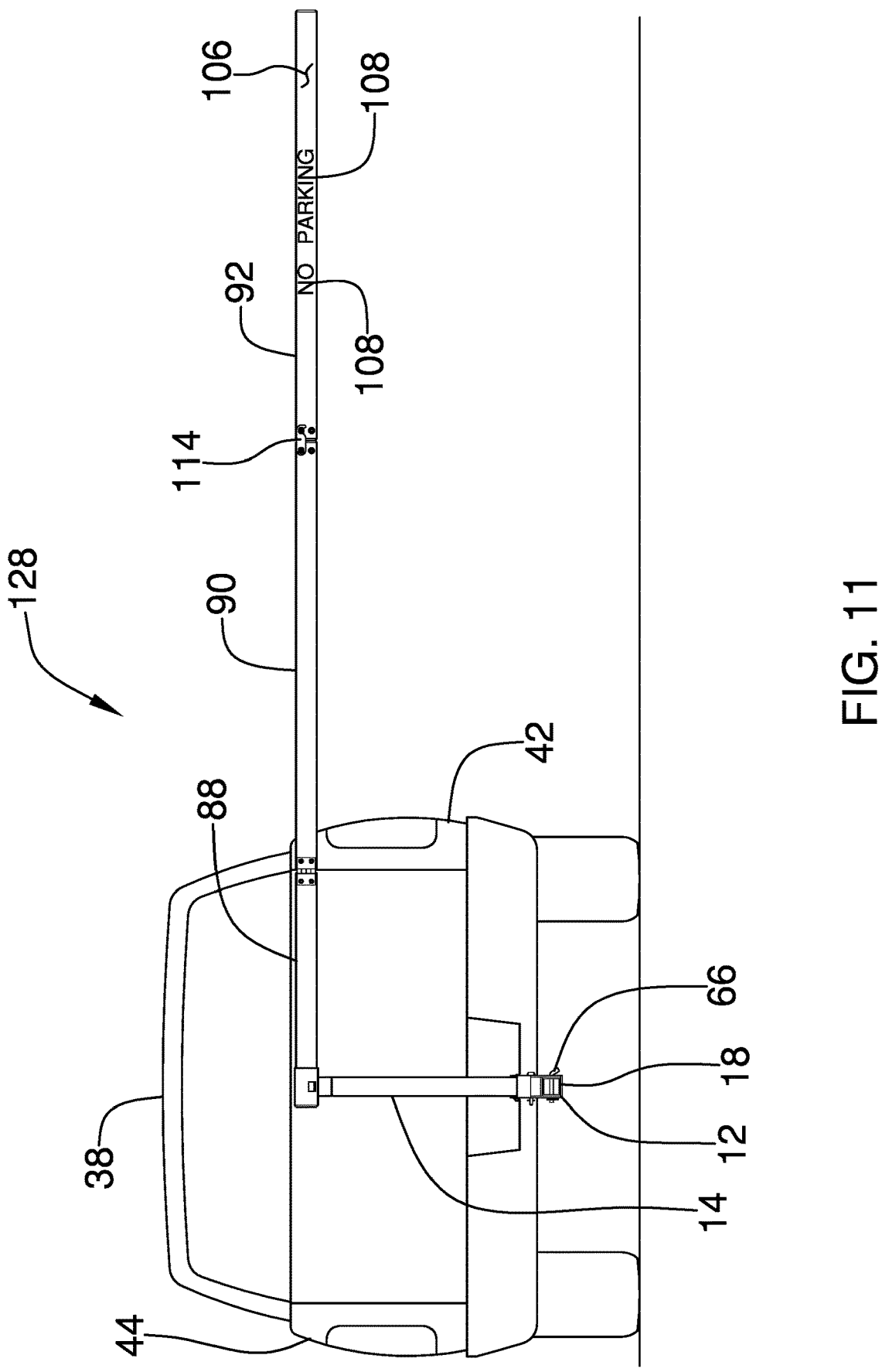
FIG. 11 is an in-use view of an embodiment of the disclosure.

The upright support 14 is pivotally attached to the mount 12 such that the upright support 14 is selectively pivotable between a vertical position, as is shown in FIG. 9, and a tilted position, as is shown in FIG. 10, wherein the upper end 24 is positioned distally from the rear end 20 of the first vehicle 22 relative to the lower end 26. In the tilted position, the upright support 14 and the arm 16 are positioned to allow for access to a tailgate 58, as is being demonstrated in FIG. 10, a trunk, a rear window, or a rear door of the first vehicle 22. A variety of pivoting means for such upright supports 14 are known in the prior art, particularly for bicycle racks, and these are anticipated by the present invention.

Figure 2:
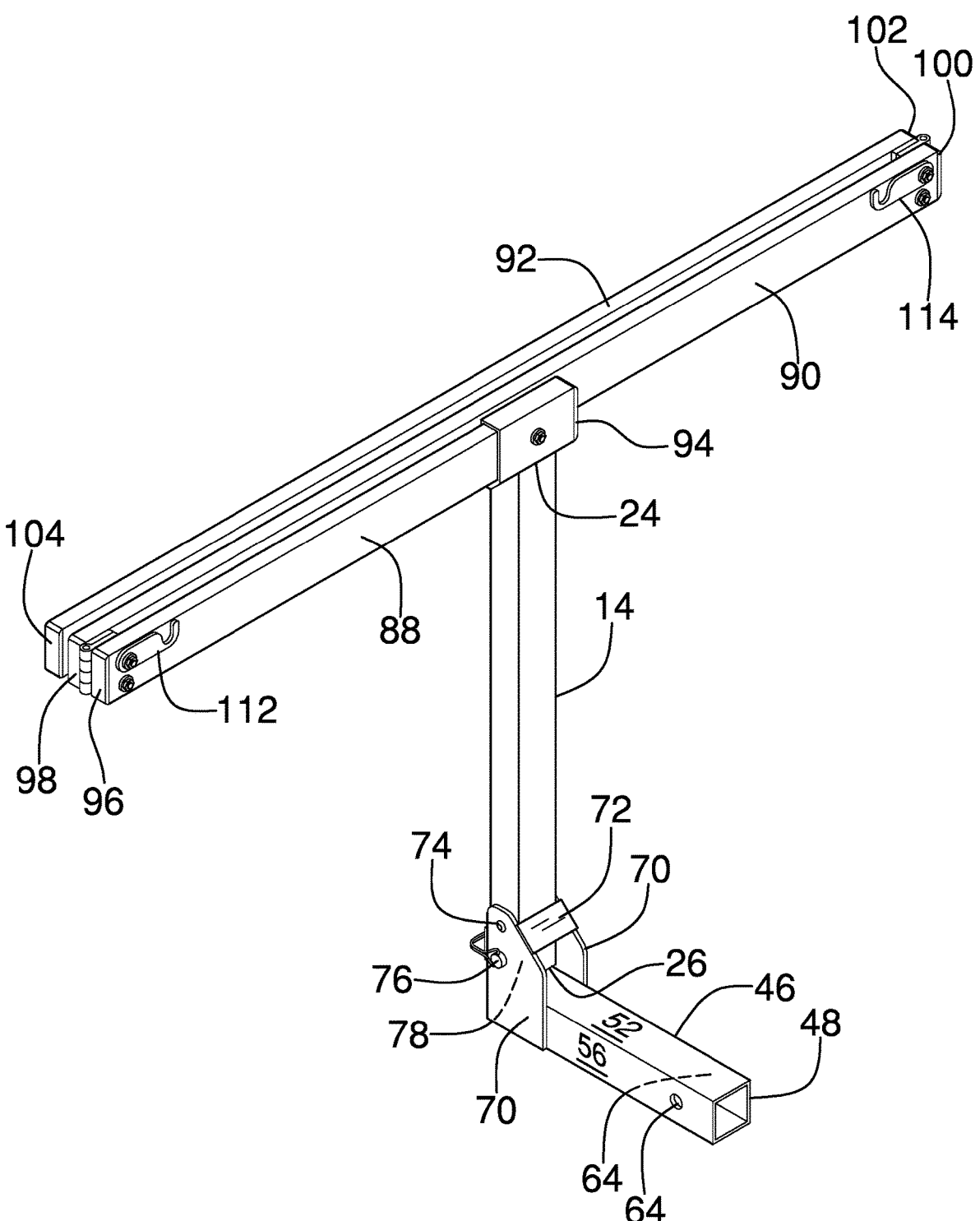
FIG. 2 is a front isometric perspective view of an embodiment of the disclosure.
Figure 3:
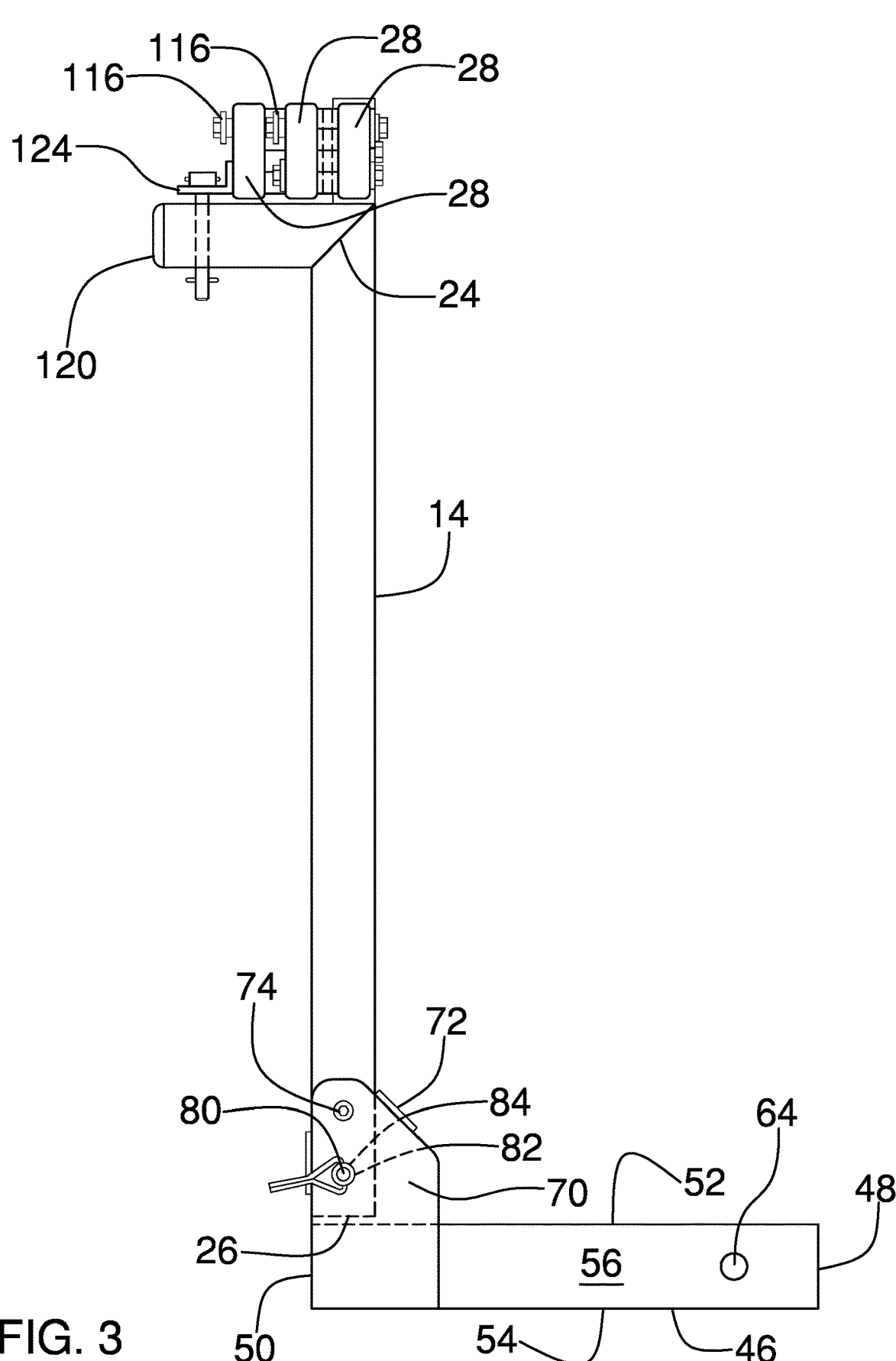
FIG. 3 is a side view of an embodiment of the disclosure.
Figure 4:
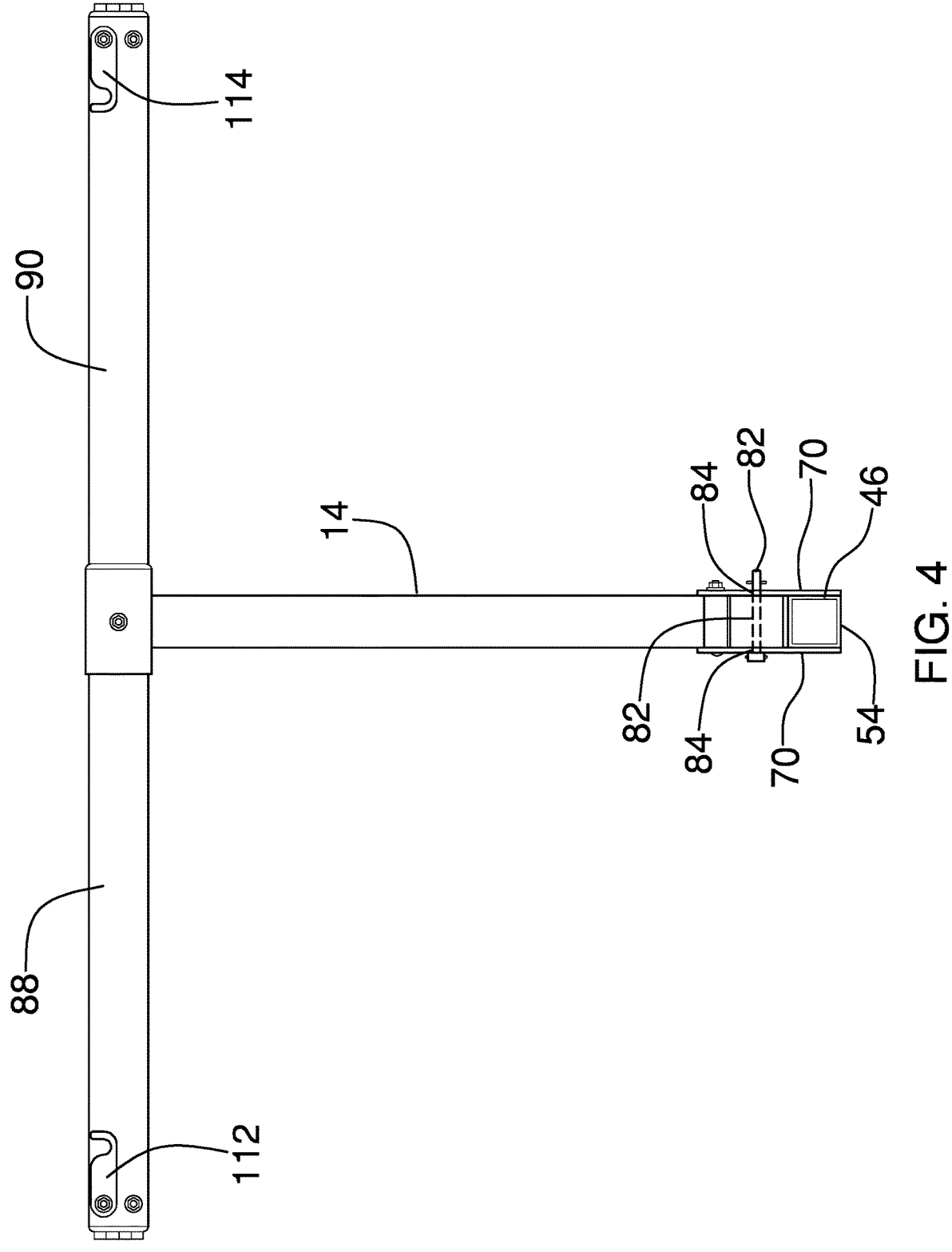
FIG. 4 is a front view of an embodiment of the disclosure.
Figure 5:
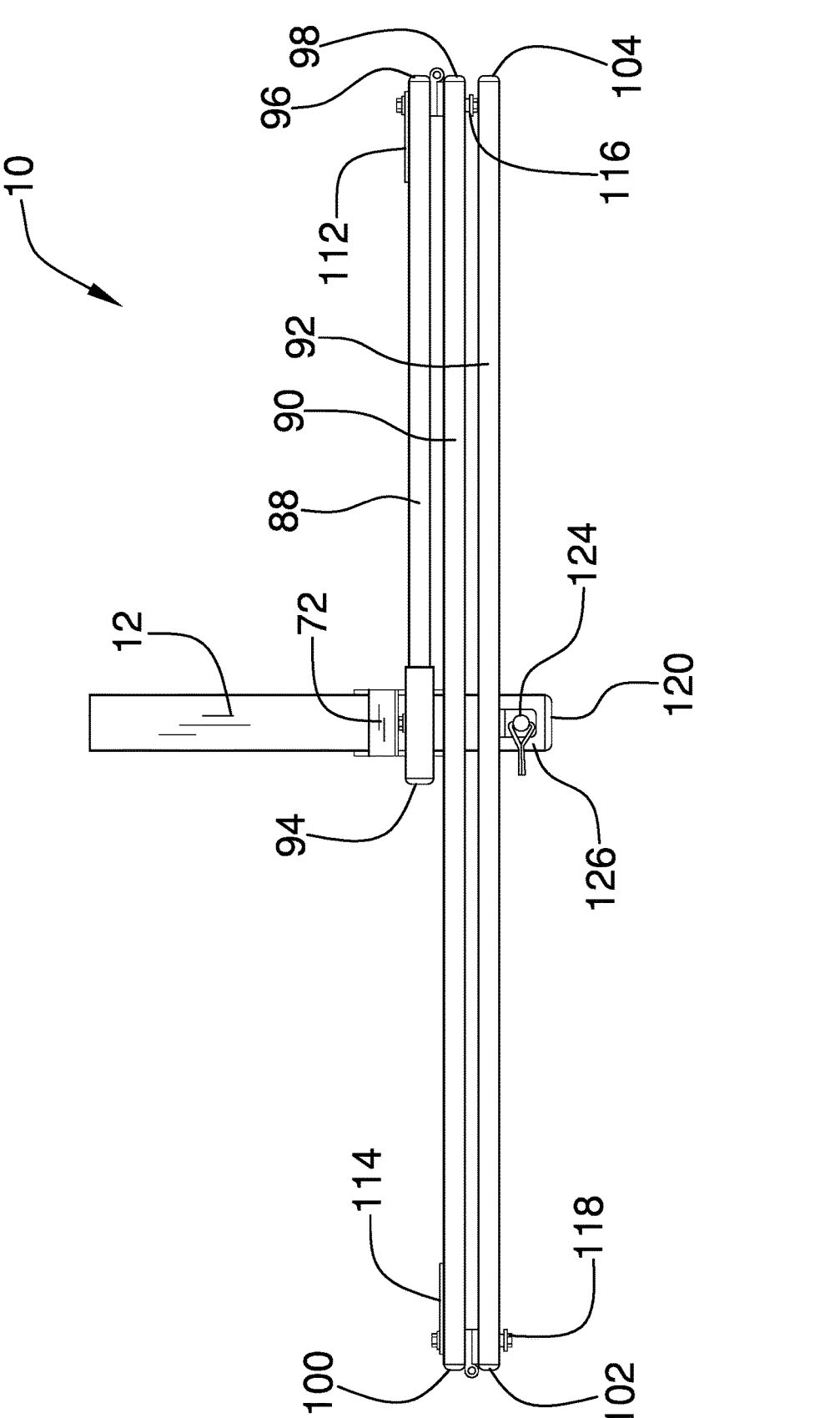
FIG. 5 is a top view of an embodiment of the disclosure in a stowed position.

By way of example, one such pivoting means is depicted in FIGS. 2-4 and comprises a pair of plates 70, which is attached to the upright support 14 and extends upwardly therefrom so that the plates 70 bracket the upright support 14. A crossarm 72 is attached to and extends between the plates 70 so that the upright support 14 abuts the crossarm 72 when the upright support 14 is in the vertical position. A pivot pin 74 is attached to and extends between the plates 70. The upright support 14 is rotationally attached to the pivot pin 74 so that the upright support 14 is selectively pivotable between the vertical position and the tilted position.

A first coupler 76 and a second coupler 78 are attached to the pair of plates 70 and the upright support 14, respectively. The second coupler 78 is complementary to the first coupler 76 so that the first coupler 76 is selectively couplable to the second coupler 78 to reversibly secure the upright support 14 in the vertical position. While various coupling means are known to those skilled in the prior art of selectively hingable uprights, FIGS. 2 and 3 depict one such coupling means, wherein a lock pin 80 is selectively insertable through a channel 82 in the upright support 14 and a pair of lock holes 84, the lock holes 84 of which are positioned singly in the plates 70.

Typically, the extended length of the arm 16 is sufficient for the arm 16 to extend at least 48 inches into the adjacent parking spot 30 or the access aisle 32 when the mount 12 is engaged with the hitch receiver 18. The arm 16 having a length of at least 60 inches would be useful to a handicap user of a first vehicle 22 who requires either a passenger's side 42 door 86 or a driver's side 44 door 88 of the first vehicle 22 to be fully opened for entry and egress. The extended length of the arm 16 may be sufficient for the arm 16 to extend at least 80 inches into the adjacent parking spot 30 or the access aisle 32 when the mount 12 is engaged with the hitch receiver 18. The extended length of the arm 16 may be sufficient for the arm 16 to extend at least 96 inches into the adjacent parking spot 30 or the access aisle 32 when the mount 12 is engaged with the hitch receiver 18, in which case the arm 16 could be extended substantially across an adjacent parking space 30 such as would be beneficial when a wheelchair ramp is deployed.

The plurality of interconnected segments 28 may comprise a fixed segment 88, a medial segment 90, and a terminal segment 92. The fixed segment 88 has a first terminus 94 and a second terminus 96, with the first terminus 94 being fixedly attached to the upright support 14. The medial segment 90 has a first endpoint 98 and a second endpoint 100, with the first endpoint 98 being hingedly attached to the second terminus 96 of the fixed segment 88. The terminal segment 92 has a first ending 102, a second ending 104, and a rear facing surface 106, which extends between the first ending 102 and the second ending 104. The first ending 102 is hingedly attached to the second terminus 96 of the medial segment 90.

The present invention anticipates the medial segment 90 comprising more than one medial segment 90. Additionally anticipated is the plurality of interconnected segments 28 being configured to hinge in a vertical plane, which passes through the fixed segment 88, rather than in a horizontal plane, which passes through the fixed segment 88, as is depicted in FIG. 6. The present invention also anticipates the plurality of interconnected segments 28 comprising a plurality of nested sections so that the arm 16 is selectively extensible.

As is shown in FIGS. 8 and 9, the rear facing surface 106 is viewable by a driver of a second vehicle 36 that is approaching the arm 16. Indicia 108 is attached to the rear facing surface 106 and indicates to the driver of the second vehicle 36 that parking alongside of the first vehicle 22 is not permitted. The indicia 108 may comprise lettering 110 spelling out "Spot Saver" or "No Parking", as is shown in FIGS. 8 and 9, respectively, or other lettering 110 or symbols to indicate that a second vehicle 36 should not park alongside the first vehicle 22.

The hitch mountable parking arm device 10 may comprise a first latch 112, a second latch 114, a first catch 116, and a second catch 118. The first latch 112 is attached to the fixed segment 88 proximate to the second terminus 96. The second latch 114 is attached to the medial segment 90 proximate to the second endpoint 100. The first catch 116 is attached to the medial segment 90 proximate to the first endpoint 98. The second catch 118 is attached to the terminal segment 92 proximate to the first ending 102. The first latch 112 and the second latch 114 are positioned to removably couple to the first catch 116 and the second catch 118, respectively, to retain the plurality of interconnected segments 28 in the deployed position. Other means for retaining the plurality of interconnected segments 28 in the deployed position are anticipated by the present invention, such as, but not limited to, spring loaded pins, slide bolt latches, and the like.

As is shown in FIG. 3, an end piece 120 is attached to the upright support 14 adjacent to the upper end 24. The end piece 120 extends perpendicularly from the upright support 14 opposingly relative to the mount 12. The end piece 120 is positioned to support the plurality of interconnected segments 28 in the stowed position. A retainer 122 is selectively attachable to the end piece 120 to retain the plurality of interconnected segments 28 in the stowed position. The retainer 122 could comprise a bracket 124, which can be pinned to a top side 126 of the end piece 120, as is shown in FIG. 6, or other retaining means, such as, but not limited to a spring loaded pin biased to an extended configuration, wherein the spring loaded pin would protrude from the top side of the end piece 120 to retain the plurality of interconnected segments 28 in the stowed position. The spring loaded pin would extractable into the end piece 120 by pulling on a knob that is operationally attached to the spring loaded pin and which is positioned on an underside of the end piece.

The present invention also includes a hitch mounted parking arm system 128, which comprises a first vehicle 22 and a hitch mountable parking arm device 10, as per the specification above. The first vehicle 22 has a rear end 20 to which a hitch receiver 18 is attached. A mount 12 of the hitch mountable parking arm device 10 is removably secured to the hitch receiver 18. An upright support 14 of the hitch mountable parking arm device 10 has an upper end 24 and a lower end 26. The lower end 26 is attached to the mount 12 so that the upright support 14 extends vertically from the mount 12. An arm 16 of the hitch mountable parking arm device 10 is attached to and extends perpendicularly from the upper end 24. The arm 16, which is horizontally orientated when the upright support 14 is vertically orientated, comprises a plurality of interconnected segments 28. The arm 16 is reversibly positionable in a stowed position having a retracted length and in a deployed position having an extended length. The arm 16 thus is extendable into an adjacent parking spot 30 or an access aisle 32.

In use, the hitch mountable parking arm device 10 enables a method of preventing a second vehicle from parking alongside a first vehicle 130 comprises providing the hitch mountable parking arm device 10, according to the specification above. A first step 132 of the method 130 is removably securing the mount 12 to a hitch receiver 18 that is attached to the first vehicle 22. A second step 134 of the method 130 is parking the first vehicle 22 in an accessible parking spot 34. A third step 136 of the method 130 is deploying the arm 16 so that the arm 16 extends linearly from the upright support 14 into an adjacent parking spot 30 or an access aisle 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch mountable parking arm device comprising:
a mount configured to be removably securable to a hitch receiver, wherein the hitch receiver is attachable to a rear end of a first vehicle;
an upright support having an upper end and a lower end, the lower end being attached to the mount such that the upright support extends vertically from the mount;
an arm being attached to and extending perpendicularly from the upper end, wherein the arm is horizontally orientated when the upright support is vertically orientated, the arm comprising a plurality of interconnected segments such that the arm is reversibly positionable in a stowed position having a retracted length and in a deployed position having an extended length, wherein the arm is extendable into an adjacent parking spot or an access aisle when the mount is engaged with the hitch receiver;

an end piece being attached to the upright support adjacent to the upper end, the end piece extending perpendicularly from the upright support opposingly relative to the mount such that the end piece is positioned to support the plurality of interconnected segments in the stowed position; and a retainer being selectively attachable to the end piece for retaining the plurality of interconnected segments in the stowed position.

2. The hitch mountable parking arm device of claim 1, wherein the mount comprises a hitch tube having a first end, a second end, an upper face, a lower face, opposed side faces, a size, and a shape, the size and shape being complementary to a hitch receiver that is tubular, wherein the hitch tube is configured to be inserted by the first end into the hitch receiver to removably secure the hitch tube to the first vehicle.

3. The hitch mountable parking arm device of claim 2, further including:

the hitch tube having a pair of first holes positioned therein such that the first holes of the pair of first holes are opposingly positioned in the opposed side faces proximate to the first end;

the hitch receiver being tubular; and a hitch pin being selectively insertable through a pair of second holes in the hitch receiver and the pair of first holes to removably secure the hitch tube to the hitch receiver.

4. The hitch mountable parking arm device of claim 1, wherein the upright support is pivotally attached to the mount such that the upright support is selectively pivotable between a vertical position and a tilted position, wherein the upper end is positioned distally from the rear end of the first vehicle relative to the lower end.

5. The hitch mountable parking arm device of claim 1, wherein the extended length of the arm is sufficient for the arm to extend at least 48 inches into the adjacent parking spot or the access aisle when the mount is engaged with the hitch receiver.

6. The hitch mountable parking arm device of claim 1, wherein the extended length of the arm is sufficient for the arm to extend at least 80 inches into the adjacent parking spot or the access aisle when the mount is engaged with the hitch receiver.

7. The hitch mountable parking arm device of claim 1, wherein the extended length of the arm is sufficient for the arm to extend at least 96 inches into the adjacent parking spot or the access aisle when the mount is engaged with the hitch receiver.

8. The hitch mountable parking arm device of claim 1, wherein the plurality of interconnected segments comprises:

a fixed segment having a first terminus and a second terminus, the first terminus being fixedly attached to the upright support;

a medial segment having a first endpoint and a second endpoint, the first endpoint being hingedly attached to the second terminus of the fixed segment; and a terminal segment having a first ending, a second ending, and a rear facing surface extending between the first ending and the second ending, the first ending being hingedly attached to the second terminus of the medial segment.

9. The hitch mountable parking arm device of claim 8, further including:

the rear facing surface facing a driver of a second vehicle approaching the arm; and indicia being attached to the rear facing surface and indicating to the driver of the second vehicle that parking alongside the first vehicle is not permitted.

10. A hitch mountable parking arm device comprising:

a mount configured to be removably securable to a hitch receiver, wherein the hitch receiver is attachable to a rear end of a first vehicle;

an upright support having an upper end and a lower end, the lower end being attached to the mount such that the upright support extends vertically from the mount;

an arm being attached to and extending perpendicularly from the upper end, wherein the arm is horizontally orientated when the upright support is vertically orientated, the arm comprising a plurality of interconnected segments such that the arm is reversibly positionable in a stowed position having a retracted length and in a deployed position having an extended length, wherein the arm is extendable into an adjacent parking spot or an access aisle when the mount is engaged with the hitch receiver;

wherein the upright support is pivotally attached to the mount such that the upright support is selectively pivotable between a vertical position and a tilted position, wherein the upper end is positioned distally from the rear end of the first vehicle relative to the lower end;

a pair of plates being attached to the upright support and extending upwardly therefrom, such that the plates of the pair of plates bracket the upright support;

a crossarm being attached to and extending between the plates of the pair of plates, such that the upright support abuts the crossarm when the upright support is in the vertical position;

a pivot pin being attached to and extending between the plates of the pair of plates, the upright support being rotationally attached to the pivot pin, such that the upright support is selectively pivotable between the vertical position and the tilted position;

a first coupler being attached to the pair of plates; and a second coupler being attached to the upright support, the second coupler being complementary to the first coupler, such that the first coupler is selectively couplable to the second coupler for reversibly securing the upright support in the vertical position.

11. A hitch mountable parking arm device comprising:

a mount configured to be removably securable to a hitch receiver, wherein the hitch receiver is attachable to a rear end of a first vehicle;

an upright support having an upper end and a lower end, the lower end being attached to the mount such that the upright support extends vertically from the mount;

an arm being attached to and extending perpendicularly from the upper end, wherein the arm is horizontally orientated when the upright support is vertically orientated, the arm comprising a plurality of interconnected segments such that the arm is reversibly positionable in a stowed position having a retracted length and in a deployed position having an extended length, wherein the arm is extendable into an adjacent parking spot or an access aisle when the mount is engaged with the hitch receiver;

wherein the plurality of interconnected segments includes a fixed segment having a first terminus and a second terminus, the first terminus being fixedly attached to the upright support, a medial segment having a first endpoint and a second endpoint, the first endpoint being hingedly attached to the second terminus of the fixed segment, and a terminal segment having a first ending, a second
ending, and a rear facing surface extending between
the first ending and the second ending, the first
ending being hingedly attached to the second termi-
nus of the medial segment;

a first latch being attached to the fixed segment proximate
to the second terminus;

a second latch being attached to the medial segment
proximate to the second endpoint;

a first catch being attached to the medial segment proxi-
mate to the first endpoint;

a second catch being attached to the terminal segment
proximate to the first ending; and wherein the first latch and the second latch are positioned
to removably couple to the first catch and the second
catch, respectively, to retain the plurality of intercon-
nected segments in the deployed position.

\* \* \* \* \*